United States Patent
Zhan et al.

(10) Patent No.: US 11,781,621 B2
(45) Date of Patent: Oct. 10, 2023

(54) MODULAR DESIGN GEARBOX AND GEAR IMPLEMENTATION METHOD

(71) Applicants: JIANGSU ADVANCED CONSTRUCTION MACHINERY INNOVATION CENTER LTD., Jiangsu (CN); JIANGSU XCMG CONSTRUCTION MACHINERY RESEARCH INSTITUTE LTD., Jiangsu (CN)

(72) Inventors: Dongan Zhan, Jiangsu (CN); Chang Lv, Jiangsu (CN); Weipeng Yan, Jiangsu (CN); Guoguo Shi, Jiangsu (CN); Gang Zhang, Jiangsu (CN)

(73) Assignees: JIANGSU ADVANCED CONSTRUCTION MACHINERY INNOVATION CENTER LTD.; JIANGSU XCMG CONSTRUCTION MACHINERY RESEARCH INSTITUTE LTD.

(*) Notice: Subject to any disclaimer, the term of this patent is extended or adjusted under 35 U.S.C. 154(b) by 0 days.

(21) Appl. No.: 17/619,557

(22) PCT Filed: Dec. 4, 2020

(86) PCT No.: PCT/CN2020/133744
§ 371 (c)(1),
(2) Date: Dec. 16, 2021

(87) PCT Pub. No.: WO2021/227456
PCT Pub. Date: Nov. 18, 2021

(65) Prior Publication Data
US 2023/0265912 A1    Aug. 24, 2023

(30) Foreign Application Priority Data
May 14, 2020    (CN) .......................... 202010405157.8

(51) Int. Cl.
*F16H 3/093*    (2006.01)
*F16H 3/00*    (2006.01)

(52) U.S. Cl.
CPC ............. *F16H 3/093* (2013.01); *F16H 3/006* (2013.01); *F16H 2200/006* (2013.01); *F16H 2200/0095* (2013.01)

(58) Field of Classification Search
CPC .... F16H 3/093; F16H 3/006; F16H 2200/006; F16H 2200/0095
(Continued)

(56) References Cited

U.S. PATENT DOCUMENTS

| | | | | |
|---|---|---|---|---|
| 4,584,891 A | * | 4/1986 | Mori ........................ | F16H 3/093 74/331 |
| 5,249,475 A | * | 10/1993 | McAskill .............. | F16H 37/043 74/331 |

(Continued)

FOREIGN PATENT DOCUMENTS

| CN | 102003501 A | * | 4/2011 | |
|---|---|---|---|---|
| CN | 104373526 A | * | 2/2015 | ............. F16H 3/093 |

*Primary Examiner* — Ha Dinh Ho

(57) ABSTRACT

A modular design gearbox and a gear implementation method are provided. The gearbox includes a body, a drive shaft, four intermediate shafts, and an output shaft. The gearbox is of a six-shaft layout. The drive shaft S1, the intermediate shaft S4 and the intermediate shaft S5 are each provided with two clutch packs, and the intermediate shaft S2 is provided with one clutch pack. According to such a structure, a transmission path is short, and stability is better. By means of six shafts and seven clutches, the gearbox achieves a mode of up to eight forward gears and four backward gears, a speed ratio range is wide, and the gearbox can be adjusted flexibly, a less-gear mode can be achieved by reducing some of components, modularization is achieved, universality is improved, and the production cost and use cost of the gearbox are reduced.

4 Claims, 4 Drawing Sheets

(58) Field of Classification Search
USPC .................................................. 74/330, 331
See application file for complete search history.

(56) References Cited

U.S. PATENT DOCUMENTS

| | | | | |
|---|---|---|---|---|
| 5,743,142 | A * | 4/1998 | Leber ...................... | F16H 3/093 |
| | | | | 74/331 |
| 6,513,399 | B2 * | 2/2003 | Lamela ................... | F16H 3/093 |
| | | | | 74/331 |
| 6,988,426 | B2 * | 1/2006 | Calvert ................... | F16H 3/093 |
| | | | | 74/331 |
| 7,454,991 | B2 * | 11/2008 | Buck ...................... | F16H 37/046 |
| | | | | 74/331 |
| 8,522,634 | B2 * | 9/2013 | Bridges .................. | B60K 6/547 |
| | | | | 74/331 |
| 10,428,905 | B2 * | 10/2019 | Regenscheit ........... | F16H 3/093 |
| 2017/0305260 | A1 * | 10/2017 | Ruan ...................... | F16H 3/093 |
| 2020/0378473 | A1 * | 12/2020 | Kim ......................... | F16H 1/46 |

\* cited by examiner

MODULAR DESIGN GEARBOX AND GEAR IMPLEMENTATION METHOD

FIELD

The present invention relates to the technical field of gearboxes, and in particular, to a modular design gearbox and a gear implementation method.

BACKGROUND

There are many types of main engine products for engineering machinery and the demand for a single type of main engine product is relatively low. It is not realistic to design and develop gearboxes for various main engines. This requires that the gearboxes applied to the construction machinery can cover a variety of products with similar power ranges. In addition, the working conditions of the main engine products for construction machinery are complex, and the requirements for the number of gears and transmission ratios are also different, and thus the requirements for the flexibility of the number of gears and transmission ratios of the construction machinery gearbox and the universality of parts are higher.

For a main engine of multi-gear requirements, a customer has increasingly higher requirements for product smoothness, which requires the gearbox to have more gears and a larger speed ratio range. Taking a motor grader as an example, a transmission currently applied to the motor grader is mainly a fixed-shaft gearbox of six forward gears and three backward gears based on the ZF technical solution, and a speed ratio of a first forward gear is about 5.2. In recent years, with the increasing requirements of a user of the motor grader for the smoothness experience of the main engine, the motor grader requires the first forward gear of the gearbox to provide a larger speed ratio (about 7.5), to reduce the sensitivity of the main engine to an external load during operation, thereby improving the operation smoothness. In addition, it is also necessary to increase the number of gears of the gearbox, especially the number of forward gears (increased to eight gears), to reduce the impact of shifting and improve the smoothness of shifting.

For some main engines such as loaders, a loader only carries out a shovel loading cycle of repeatedly shifting a second forward gear, a first forward gear and a second backward gear in a smaller area. Too many gears may lead to tedious work and lower efficiency. The demand for fewer gears is put forward for the gearbox. If coupling of some clutches is suppressed by a multi-gear gearbox to achieve fewer gears, the actual number of parts is not reduced, which causes unnecessary waste. However, redesigning and developing a new structure of a less-gear gearbox not only increases the design cost, but it is also difficult to ensure the universality to original multi-gear gearbox components, resulting in an increase in production costs.

On the other hand, gearboxes in the field of construction machinery are divided into planetary gearboxes and fixed-shaft gearboxes according to the form of gear trains. The planetary gearbox has a compact structure and requires less space, but has a complex structure, higher accuracy requirements, fewer gears, short service life and higher failure rate, while the fixed-shaft gearbox has a simple structure design and is easy to achieve variable gears, gear ratios, strong adaptability, convenient manufacturing and maintenance, and can meet the requirements for flexibility and modularity of construction machinery gearboxes, which is the development trend of the high-end market of construction machinery in the future.

At present, the fixed-shaft gearboxes applied in the construction machinery industry can be divided into two types according to the arrangement of clutches on shafts. One is to arrange two clutch packs on a shaft. The most widely used in the market is the WG-series transmission structure solution from the German ZF company, such as the solution as mentioned in patent CN202392055U. The other is to arrange only one clutch pack on a shaft. The structure solution is as mentioned in patent CN100491768C. The two technical solutions can achieve up to six forward gears and three backward gears, and the speed ratio range is between 0.6 and 6.

SUMMARY

To address the shortcomings of existing technologies, the present invention provides a modular design gearbox and a gear implementation method, which adopts the form of two clutches on a single shaft. By means of six shafts and seven clutches, the gearbox achieves a mode of up to eight forward gears and four backward gears, a speed ratio range is wide, and the gearbox can be adjusted flexibly, a less-gear mode can be achieved by reducing some of components, modularization is achieved, universality is improved, and the production cost and use cost of the gearbox are reduced.

As an aspect of the present invention, provided is a modular design gearbox.

The modular design gearbox includes a body, and further includes:

a drive shaft S1, provided thereon with a fixed gear Z2, a floating gear Z1 installed through a clutch CR, and a floating gear Z3 installed through a clutch CF;

an intermediate shaft S2, provided thereon with a fixed gear Z4, a fixed gear Z6, and a floating gear Z5 installed through a clutch CFH, the fixed gear Z6 being engaged with the floating gear Z3, and the floating gear Z5 being engaged with the fixed gear Z2;

an intermediate shaft S3, provided thereon with a fixed gear Z7 and a fixed gear Z8, the fixed gear Z7 being engaged with the floating gear Z1, and the fixed gear Z7 being engaged with the fixed gear Z4;

an intermediate shaft S4, provided thereon with a fixed gear Z11, a floating gear Z9 installed through a clutch C2, and a floating gear Z10 installed through a clutch C1, the floating gear Z9 being engaged with the fixed gear Z7, and the floating gear Z10 being engaged with the fixed gear Z8;

an intermediate shaft S5, provided thereon with a fixed gear Z14, a floating gear Z12 installed through a clutch C4, and a floating gear Z13 installed through a clutch C3, the floating gear Z12 being engaged with the fixed gear Z7, and the floating gear Z13 being engaged with the fixed gear Z8; and an output shaft S6, provided thereon with a fixed gear Z15 and a fixed gear Z16, the fixed gear Z15 being engaged with the fixed gear Z11, and the fixed gear Z16 being engaged with the fixed gear Z14;

in a forward gear mode, rotation directions of the drive shaft S1, the intermediate shaft S3, and the output shaft S6 are the same, and are opposite to rotation directions of the intermediate shaft S2, the intermediate shaft S4, and the intermediate shaft S5; and in a backward gear mode, the rotation directions of the drive shaft S1, the intermediate shaft S4, and the intermediate shaft S5 are the same, and are opposite to the rotation directions of the intermediate shaft S3 and the output shaft S6, and the intermediate shaft S2 does not participate in transmission.

Optionally, a connecting line of projections of a shaft axis of the drive shaft S1, a shaft axis of the intermediate shaft S2, and a shaft axis of the intermediate shaft S3 in a plane perpendicular to the shaft axis of the drive shaft S1 is triangular, and a connecting line of projections of the shaft axis of the intermediate shaft S3, a shaft axis of the intermediate shaft S4, a shaft axis of the intermediate shaft S5, and a shaft axis of the output shaft S6 in a plane perpendicular to the shaft axis of the intermediate shaft S3 is quadrilateral.

As another aspect of the present invention, provided is gear implementation method for a modular design gearbox.

The gear implementation method for the modular design gearbox, for implementing a multi-gear mode, where the multi-gear mode includes an eight-forward-gear/four-backward-gear mode;

when the clutch CF is in an engaged state, a first forward path is formed from the floating gear Z3 through the fixed gear Z6 and the fixed gear Z4 to the fixed gear Z7;

when the clutch CFH is in an engaged state, a second forward path is formed from the fixed gear Z2 through the floating gear Z5 and the fixed gear Z4 to the fixed gear Z7;

when the clutch C1 is in an engaged state, a first output path is formed from the fixed gear Z8 through the floating gear Z10 and the fixed gear Z11 to the fixed gear Z15;

when the clutch C2 is in an engaged state, a second output path is formed from the floating gear Z9 through the fixed gear Z11 to the fixed gear Z15;

when the clutch C3 is in an engaged state, a third output path is formed from the fixed gear Z8 through the floating gear Z13 and the fixed gear Z14 to the fixed gear Z16;

when the clutch C4 is in an engaged state, a fourth output path is formed from the floating gear Z12 through the fixed gear Z14 to the fixed gear Z16; and when the clutch CR is in an engaged state, a backward path is formed from the floating gear Z1 to the fixed gear Z7;

in the eight-forward-gear/four-backward-gear mode, a first forward gear: the clutch CF and the clutch C1 are in an engaged state, and the drive shaft S1 transmits power to the output shaft S6 via the first forward path and the first output path;

a second forward gear: the clutch CFH and the clutch C1 are in an engaged state, and the drive shaft S1 transmits power to the output shaft S6 via the second forward path and the first output path;

a third forward gear: the clutch CF and the clutch C2 are in an engaged state, and the drive shaft S1 transmits power to the output shaft S6 via the first forward path and the second output path;

a fourth forward gear: the clutch CFH and the clutch C2 are in an engaged state, and the drive shaft S1 transmits power to the output shaft S6 via the second forward path and the second output path;

a fifth forward gear: the clutch CF and the clutch C3 are in an engaged state, and the drive shaft S1 transmits power to the output shaft S6 via the first forward path and the third output path;

a sixth forward gear: the clutch CFH and the clutch C3 are in an engaged state, and the drive shaft S1 transmits power to the output shaft S6 via the second forward path and the third output path;

a seventh forward gear: the clutch CF and the clutch C4 are in an engaged state, and the drive shaft S1 transmits power to the output shaft S6 via the first forward path and the fourth output path;

an eighth forward gear: the clutch CFH and the clutch C4 are in an engaged state, and the drive shaft S1 transmits power to the output shaft S6 via the second forward path and the fourth output path;

a first backward gear: the clutch CR and the clutch C1 are in an engaged state, and the drive shaft S1 transmits power to the output shaft S6 via the backward path and the first output path;

a second backward gear: the clutch CR and the clutch C2 are in an engaged state, and the drive shaft S1 transmits power to the output shaft S6 via the backward path and the second output path;

a third backward gear: the clutch CR and the clutch C3 are in an engaged state, and the drive shaft S1 transmits power to the output shaft S6 via the backward path and the third output path; and a fourth backward gear: the clutch CR and the clutch C4 are in an engaged state, and the drive shaft S1 transmits power to the output shaft S6 via the backward path and the fourth output path.

Optionally, the method is used for implementing the less-gear mode. In the four-forward-gear/four-backward-gear mode, the clutch CFH, the floating gear Z5 and the fixed gear Z2 do not participate in transmission, where:

a first forward gear: having a same transmission path as the first forward gear in the eight-forward-gear/four-backward-gear mode;

a second forward gear: having a same transmission path as the third forward gear in the eight-forward-gear/four-backward-gear mode;

a third forward gear: having a same transmission path as the fifth forward gear in the eight-forward-gear/four-backward-gear mode;

a fourth forward gear: having a same transmission path as the seventh forward gear in the eight-forward-gear/four-backward-gear mode;

a first backward gear: having a same transmission path as the first backward gear in the eight-forward-gear/four-backward-gear mode;

a second backward gear: having a same transmission path as the second backward gear in the eight-forward-gear/four-backward-gear mode;

a third backward gear: having a same transmission path as the third backward gear in the eight-forward-gear/four-backward-gear mode; and a fourth backward gear: having a same transmission path as the fourth backward gear in the eight-forward-gear/four-backward-gear mode.

Optionally, the method is used for implementing the less-gear mode. In the four-forward-gear/four-backward-gear mode, the clutch CF, the floating gear Z3 and the fixed gear Z6 do not participate in transmission, where:

a first forward gear: having a same transmission path as the second forward gear in the eight-forward-gear/four-backward-gear mode;

a second forward gear: having a same transmission path as the fourth forward gear in the eight-forward-gear/four-backward-gear mode;

a third forward gear: having a same transmission path as the sixth forward gear in the eight-forward-gear/four-backward-gear mode;

a fourth forward gear: having a same transmission path as the eighth forward gear in the eight-forward-gear/four-backward-gear mode;

a first backward gear: having a same transmission path as the first backward gear in the eight-forward-gear/four-backward-gear mode;

a second backward gear: having a same transmission path as the second backward gear in the eight-forward-gear/four-backward-gear mode;

a third backward gear: having a same transmission path as the third backward gear in the eight-forward-gear/four-backward-gear mode; and a fourth backward gear: having a same transmission path as the fourth backward gear in the eight-forward-gear/four-backward-gear mode.

The technical solution of the present invention has the following beneficial effects: the modular design gearbox and the gear implementation method of the present invention adopt the form of two clutches on a single shaft. By means of six shafts and seven clutches, the gearbox achieves a mode of up to eight forward gears and four backward gears, a speed ratio range is wide, and the gearbox can be adjusted flexibly, a less-gear mode can be achieved by reducing some of components, modularization is achieved, universality is improved, and the production cost and use cost of the gearbox are reduced. Moreover, each forward gear is achieved by coupling two clutches and conducting gear engagement four times, each backward gear is achieved by coupling two clutches and conducting gear engagement three times, the transmission path is short, and the reliability is high.

DETAILED DESCRIPTION

Exemplary embodiments of the present invention are described below with reference to the accompanying drawings, including various details of the embodiments of the present invention to facilitate understanding, which should be regarded as merely exemplary. Therefore, those of ordinary skill in the art should realize that various changes and modifications can be made to the embodiments described herein, without departing from the scope and spirit of the present invention. Similarly, for clarity and conciseness, descriptions of well-known functions and structures are omitted in the following description.

Figure 1:
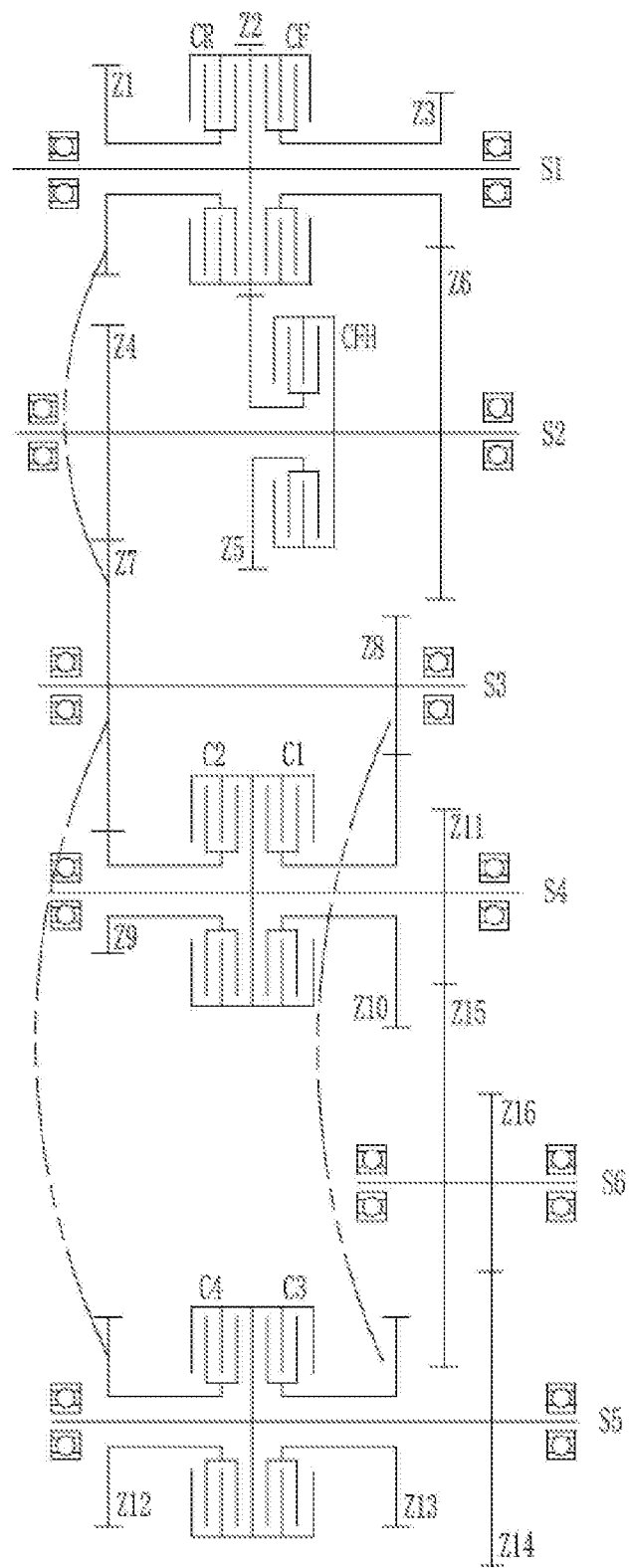
FIG. 1 is a schematic diagram of transmission in an eight-forward-gear/four-backward-gear mode of a modular design gearbox of the present invention.
Figure 2:
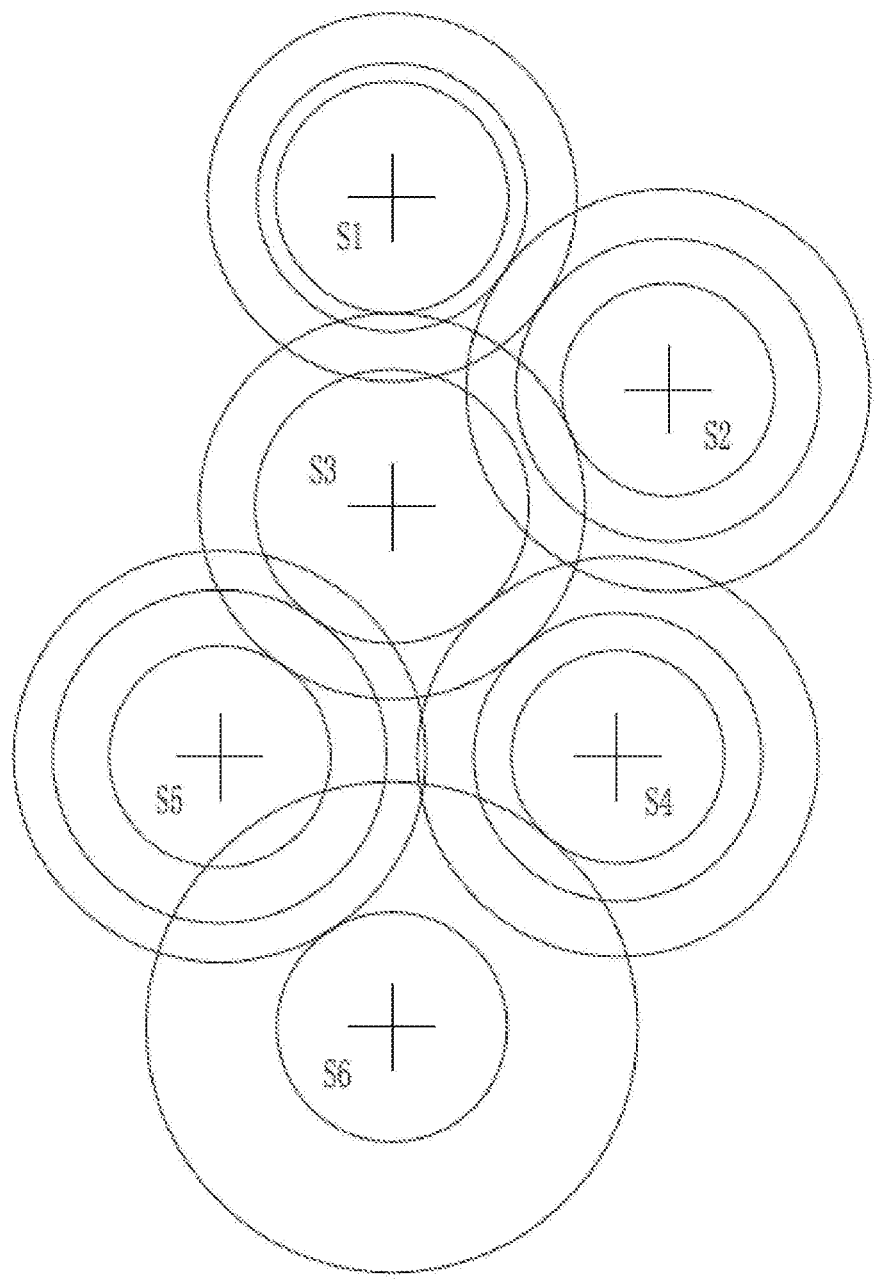
FIG. 2 is a topological diagram of an end face of the structure in FIG. 1.

Referring to FIG. 1 and FIG. 2, a modular design gearbox includes a body, and further includes a drive shaft S1, an intermediate shaft S2, an intermediate shaft S3, an intermediate shaft S4, an intermediate shaft S5, and an output shaft S6. The drive shaft S1 is provided thereon with a fixed gear Z2, a floating gear Z1 installed through a clutch CR, and a floating gear Z3 installed through a clutch CF. The intermediate shaft S2 is provided thereon with a fixed gear Z4, a fixed gear Z6, and a floating gear Z5 installed through a clutch CFH. The fixed gear Z6 is engaged with the floating gear Z3, and the floating gear Z5 is engaged with the fixed gear Z2. The intermediate shaft S3 is provided thereon with a fixed gear Z7 and a fixed gear Z8. The fixed gear Z7 is engaged with the floating gear Z1, and the fixed gear Z7 is engaged with the fixed gear Z4. The intermediate shaft S4 is provided thereon with a fixed gear Z11, a floating gear Z9 installed through a clutch C2, and a floating gear Z10 installed through a clutch C1. The floating gear Z9 is engaged with the fixed gear Z7, and the floating gear Z10 is engaged with the fixed gear Z8. The intermediate shaft S5 is provided thereon with a fixed gear Z14, a floating gear Z12 installed through a clutch C4, and a floating gear Z13 installed through a clutch C3. The floating gear Z12 is engaged with the fixed gear Z7, and the floating gear Z13 is engaged with the fixed gear Z8. The output shaft S6 is provided thereon with a fixed gear Z15 and a fixed gear Z16. The fixed gear Z15 is engaged with the fixed gear Z11, and the fixed gear Z16 is engaged with the fixed gear Z14. In a forward gear mode, rotation directions of the drive shaft S1, the intermediate shaft S3, and the output shaft S6 are the same, and are opposite to rotation directions of the intermediate shaft S2, the intermediate shaft S4, and the intermediate shaft S5. In a backward gear mode, the rotation directions of the drive shaft S1, the intermediate shaft S4, and the intermediate shaft S5 are the same, and are opposite to the rotation directions of the intermediate shaft S3 and the output shaft S6, and the intermediate shaft S2 does not participate in transmission.

Furthermore, a connecting line of projections of a shaft axis of the drive shaft S1, a shaft axis of the intermediate shaft S2, and a shaft axis of the intermediate shaft S3 in a plane perpendicular to the shaft axis of the drive shaft S1 is triangular, and a connecting line of projections of the shaft axis of the intermediate shaft S3, a shaft axis of the intermediate shaft S4, a shaft axis of the intermediate shaft S5, and a shaft axis of the output shaft S6 in a plane perpendicular to the shaft axis of the intermediate shaft S3 is quadrilateral.

The gear implementation method for the modular design gearbox, for implementing a multi-gear mode. The multi-gear mode includes an eight-forward-gear/four-backward-gear mode.

When the clutch CF is in an engaged state, a first forward path is formed from the floating gear Z3 through the fixed gear Z6 and the fixed gear Z4 to the fixed gear Z7.

When the clutch CFH is in an engaged state, a second forward path is formed from the fixed gear Z2 through the floating gear Z5 and the fixed gear Z4 to the fixed gear Z7.

When the clutch C1 is in an engaged state, a first output path is formed from the fixed gear Z8 through the floating gear Z10 and the fixed gear Z11 to the fixed gear Z15.

When the clutch C2 is in an engaged state, a second output path is formed from the floating gear Z9 through the fixed gear Z11 to the fixed gear Z15.

When the clutch C3 is in an engaged state, a third output path is formed from the fixed gear Z8 through the floating gear Z13 and the fixed gear Z14 to the fixed gear Z16.

When the clutch C4 is in an engaged state, a fourth output path is formed from the floating gear Z12 through the fixed gear Z14 to the fixed gear Z16.

When the clutch CR is in an engaged state, a backward path is formed from the floating gear Z1 to the fixed gear Z7.

In the eight-forward-gear/four-backward-gear mode, a first forward gear: the clutch CF and the clutch C1 are in an engaged state, and the drive shaft S1 transmits power to the output shaft S6 via the first forward path and the first output path;

a second forward gear: the clutch CFH and the clutch C1 are in an engaged state, and the drive shaft S1 transmits power to the output shaft S6 via the second forward path and the first output path;

a third forward gear: the clutch CF and the clutch C2 are in an engaged state, and the drive shaft S1 transmits power to the output shaft S6 via the first forward path and the second output path;

a fourth forward gear: the clutch CFH and the clutch C2 are in an engaged state, and the drive shaft S1 transmits power to the output shaft S6 via the second forward path and the second output path;

a fifth forward gear: the clutch CF and the clutch C3 are in an engaged state, and the drive shaft S1 transmits power to the output shaft S6 via the first forward path and the third output path;

a sixth forward gear: the clutch CFH and the clutch C3 are in an engaged state, and the drive shaft S1 transmits power to the output shaft S6 via the second forward path and the third output path;

a seventh forward gear: the clutch CF and the clutch C4 are in an engaged state, and the drive shaft S1 transmits power to the output shaft S6 via the first forward path and the fourth output path;

an eighth forward gear: the clutch CFH and the clutch C4 are in an engaged state, and the drive shaft S1 transmits power to the output shaft S6 via the second forward path and the fourth output path;

a first backward gear: the clutch CR and the clutch C1 are in an engaged state, and the drive shaft S1 transmits power to the output shaft S6 via the backward path and the first output path;

a second backward gear: the clutch CR and the clutch C2 are in an engaged state, and the drive shaft S1 transmits power to the output shaft S6 via the backward path and the second output path;

a third backward gear: the clutch CR and the clutch C3 are in an engaged state, and the drive shaft S1 transmits power to the output shaft S6 via the backward path and the third output path; and a fourth backward gear: the clutch CR and the clutch C4 are in an engaged state, and the drive shaft S1 transmits power to the output shaft S6 via the backward path and the fourth output path.

See Table 1 for the clutch coupling situations

TABLE 1

Table of the clutch coupling situations at each gear in the eight-forward-gear/four-backward-gear mode

| Gears | | Clutch coupling |
|---|---|---|
| Forward gear | 1 | Clutch CF and clutch C1 |
| | 2 | Clutch CFH and clutch C1 |
| | 3 | Clutch CF and clutch C2 |
| | 4 | Clutch CFH and clutch C2 |
| | 5 | Clutch CF and clutch C3 |
| | 6 | Clutch CFH and clutch C3 |
| | 7 | Clutch CF and clutch C4 |
| | 8 | Clutch CFH and clutch C4 |
| Backward gear | 1 | Clutch CR and clutch C1 |
| | 2 | Clutch CR and clutch C2 |
| | 3 | Clutch CR and clutch C3 |
| | 4 | Clutch CR and clutch C4 |

Figure 3:
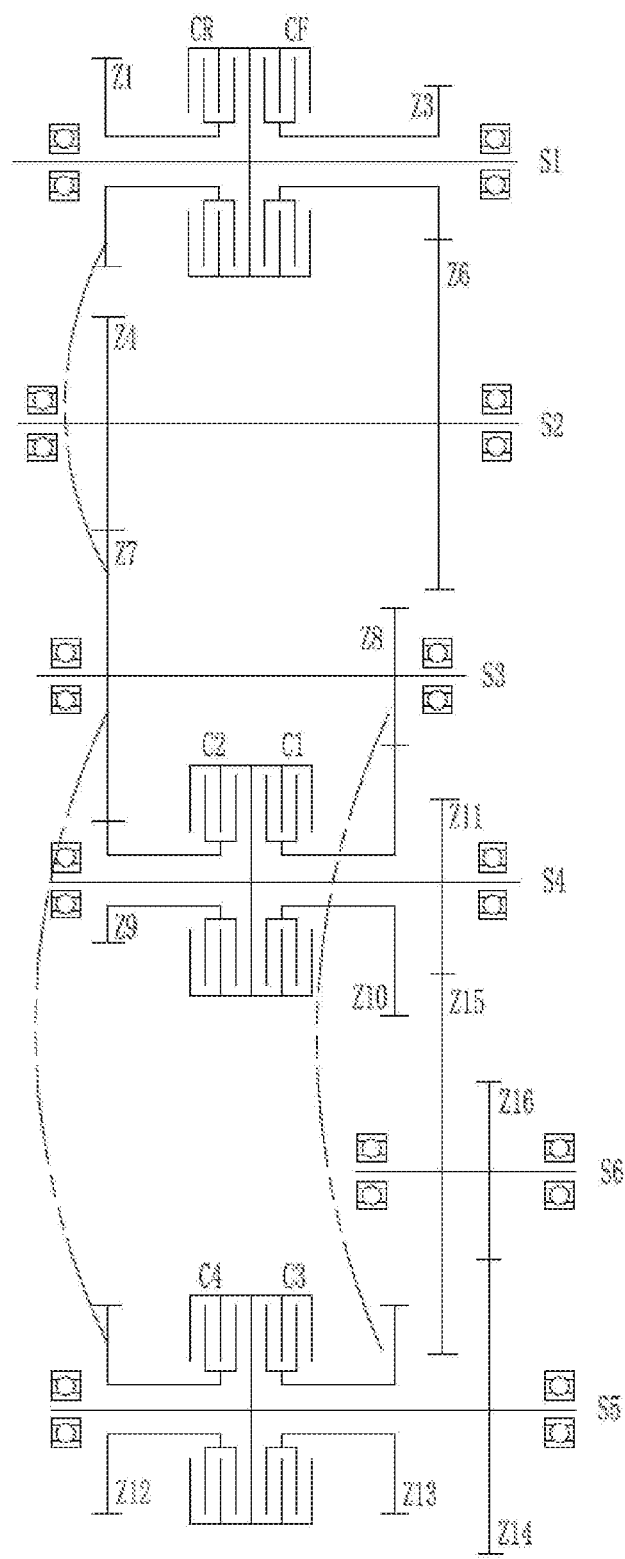
FIG. 3 is a schematic diagram I of transmission in a four-forward-gear/four-backward-gear mode of a modular design gearbox of the present invention.

As shown in FIG. 3, the method is used for implementing the structure of the less-gear mode. In the four-forward-gear/four-backward-gear mode, the clutch CFH, the floating gear Z5 and the fixed gear Z2 do not participate in transmission, where:

a first forward gear: having a same transmission path as the first forward gear in the eight-forward-gear/four-backward-gear mode;

a second forward gear: having a same transmission path as the third forward gear in the eight-forward-gear/four-backward-gear mode;

a third forward gear: having a same transmission path as the fifth forward gear in the eight-forward-gear/four-backward-gear mode;

a fourth forward gear: having a same transmission path as the seventh forward gear in the eight-forward-gear/four-backward-gear mode;

a first backward gear: having a same transmission path as the first backward gear in the eight-forward-gear/four-backward-gear mode;

a second backward gear: having a same transmission path as the second backward gear in the eight-forward-gear/four-backward-gear mode;

a third backward gear: having a same transmission path as the third backward gear in the eight-forward-gear/four-backward-gear mode; and a fourth backward gear: having a same transmission path as the fourth backward gear in the eight-forward-gear/four-backward-gear mode.

See Table 2 for the clutch coupling situations

TABLE 2

Table of the clutch coupling situations at each gear in the four-forward-gear/four-backward-gear mode

| Gears | | Clutch coupling |
|---|---|---|
| Forward gear | 1 | Clutch CF and clutch C1 |
| | 2 | Clutch CF and clutch C2 |
| | 3 | Clutch CF and clutch C3 |
| | 4 | Clutch CF and clutch C4 |
| Backward gear | 1 | Clutch CR and clutch C1 |
| | 2 | Clutch CR and clutch C2 |
| | 3 | Clutch CR and clutch C3 |
| | 4 | Clutch CR and clutch C4 |

Figure 4:
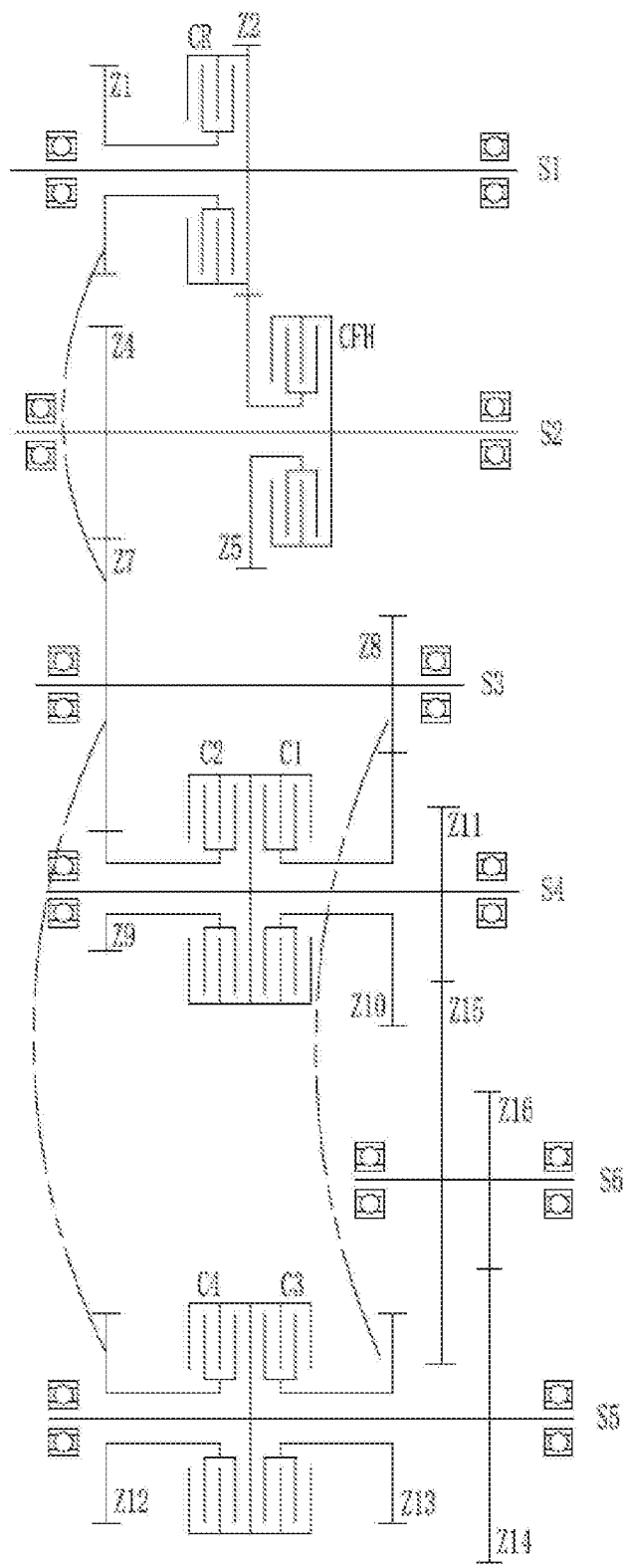
FIG. 4 is a schematic diagram II of transmission in a four-forward-gear/four-backward-gear mode of a modular design gearbox of the present invention.

As shown in FIG. 4, the method is used for implementing the structure of the less-gear mode. In the four-forward-gear/four-backward-gear mode, the clutch CF, the floating gear Z3 and the fixed gear Z6 do not participate in transmission, where:

a first forward gear: having a same transmission path as the second forward gear in the eight-forward-gear/four-backward-gear mode;

a second forward gear: having a same transmission path as the fourth forward gear in the eight-forward-gear/four-backward-gear mode;

a third forward gear: having a same transmission path as the sixth forward gear in the eight-forward-gear/four-backward-gear mode;

a fourth forward gear: having a same transmission path as the eighth forward gear in the eight-forward-gear/four-backward-gear mode;

a first backward gear: having a same transmission path as the first backward gear in the eight-forward-gear/four-backward-gear mode;

a second backward gear: having a same transmission path as the second backward gear in the eight-forward-gear/four-backward-gear mode;

a third backward gear: having a same transmission path as the third backward gear in the eight-forward-gear/four-backward-gear mode; and a fourth backward gear: having a same transmission path as the fourth backward gear in the eight-forward-gear/four-backward-gear mode.

See Table 3 for the clutch coupling situations

TABLE 3

Table of the clutch coupling situations at each gear in the four-forward-gear/four-backward-gear mode

| Gears | | Clutch coupling |
|---|---|---|
| Forward gear | 1 | Clutch CFH and clutch C1 |
| | 2 | Clutch CFH and clutch C2 |
| | 3 | Clutch CFH and clutch C3 |
| | 4 | Clutch CFH and clutch C4 |
| Backward gear | 1 | Clutch CR and clutch C1 |
| | 2 | Clutch CR and clutch C2 |
| | 3 | Clutch CR and clutch C3 |
| | 4 | Clutch CR and clutch C4 |

The gearbox in the technical solution of the present invention is of a six-shaft layout. The drive shaft S1, the intermediate shaft S4 and the intermediate shaft S5 are each provided with two clutch packs, and the intermediate shaft S2 is provided with one clutch pack. According to such a structure, a transmission path is short, and stability is better. The gear on the drive shaft S1 and the gear on the output shaft S6 can be adjusted in a larger range, so that the achievable speed ratio range can reach 0.6-8.

In conclusion, the modular design gearbox and the gear implementation method of the technical solution of the present invention adopt the form of two clutches on a single shaft. By means of six shafts and seven clutches, the gearbox achieves a mode of up to eight forward gears and four backward gears, the coupling of different clutches can be controlled, so that the mode is adjusted to a seven-forward-gear/three-backward gear mode, a six-forward-gear/three-backward gear mode, a five-forward-gear/three-backward gear mode, and a four-forward-gear/three-backward gear mode to satisfy the requirements of different main engines for different gears. The speed ratio range is wide, and the gearbox can be adjusted flexibly, a less-gear mode can be achieved by reducing some of components, modularization is achieved, universality is improved, and the production cost and use cost of the gearbox are reduced. Moreover, each forward gear is achieved by coupling two clutches and conducting gear engagement four times, each backward gear is achieved by coupling two clutches and conducting gear engagement three times, the transmission path is short, and the reliability is high.

The specific implementations above do not constitute a limitation to the protection scope of the present invention. A person skilled in the art should understand that, depending on design requirements and other factors, various modifications, combinations, sub-combinations, and substitutions can occur. Any modification, equivalent replacement, improvement and the like made within the spirit and principle of the present invention shall fall within the protection scope of the present invention.

What is claimed is:

1. A modular design gearbox, comprising a body, wherein the modular design gearbox further comprises:

a drive shaft S1, provided thereon with a fixed gear Z2, a floating gear Z1 installed through a clutch CR, and a floating gear Z3 installed through a clutch CF;

an intermediate shaft S2, provided thereon with a fixed gear Z4, a fixed gear Z6, and a floating gear Z5 installed through a clutch CFH, the fixed gear Z6 being engaged with the floating gear Z3, and the floating gear Z5 being engaged with the fixed gear Z2;

an intermediate shaft S3, provided thereon with a fixed gear Z7 and a fixed gear Z8, the fixed gear Z7 being engaged with the floating gear Z1, and the fixed gear Z7 being engaged with the fixed gear Z4;

an intermediate shaft S4, provided thereon with a fixed gear Z11, a floating gear Z9 installed through a clutch C2, and a floating gear Z10 installed through a clutch C1, the floating gear Z9 being engaged with the fixed gear Z7, and the floating gear Z10 being engaged with the fixed gear Z8;

an intermediate shaft S5, provided thereon with a fixed gear Z14, a floating gear Z12 installed through a clutch C4, and a floating gear Z13 installed through a clutch C3, the floating gear Z12 being engaged with the fixed gear Z7, and the floating gear Z13 being engaged with the fixed gear Z8; and an output shaft S6, provided thereon with a fixed gear Z15 and a fixed gear Z16, the fixed gear Z15 being engaged with the fixed gear Z11, and the fixed gear Z16 being engaged with the fixed gear Z14;

in a forward gear mode, rotation directions of the drive shaft S1, the intermediate shaft S3 and the output shaft S6 are the same, and are opposite to rotation directions of the intermediate shaft S2, the intermediate shaft S4 and the intermediate shaft S5; and in a backward gear mode, the rotation directions of the drive shaft S1, the intermediate shaft S4 and the intermediate shaft S5 are the same, and are opposite to the rotation directions of the intermediate shaft S3 and the output shaft S6, and the intermediate shaft S2 does not participate in transmission, wherein the modular design gearbox is used to implement a multi-gear mode, the multi-gear mode comprises an eight-forward-gear/four-backward-gear mode;

when the clutch CF is in an engaged state, a first forward path is formed from the floating gear Z3 through the fixed gear Z6 and the fixed gear Z4 to the fixed gear Z7;

when the clutch CFH is in an engaged state, a second forward path is formed from the fixed gear Z2 through the floating gear Z5 and the fixed gear Z4 to the fixed gear Z7;

when the clutch C1 is in an engaged state, a first output path is formed from the fixed gear Z8 through the floating gear Z10 and the fixed gear Z11 to the fixed gear Z15;

when the clutch C2 is in an engaged state, a second output path is formed from the floating gear Z9 through the fixed gear Z11 to the fixed gear Z15;

when the clutch C3 is in an engaged state, a third output path is formed from the fixed gear Z8 through the floating gear Z13 and the fixed gear Z14 to the fixed gear Z16;

when the clutch C4 is in an engaged state, a fourth output path is formed from the floating gear Z12 through the fixed gear Z14 to the fixed gear Z16; and when the clutch CR is in an engaged state, a backward path is formed from the floating gear Z1 to the fixed gear Z7;

in the eight-forward-gear/four-backward-gear mode, a first forward gear: the clutch CF and the clutch C1 are in an engaged state, and the drive shaft S1 transmits power to the output shaft S6 via the first forward path and the first output path;

a second forward gear: the clutch CFH and the clutch C1 are in an engaged state, and the drive shaft S1 transmits power to the output shaft S6 via the second forward path and the first output path;

a third forward gear: the clutch CF and the clutch C2 are in an engaged state, and the drive shaft S1 transmits power to the output shaft S6 via the first forward path and the second output path;

a fourth forward gear: the clutch CFH and the clutch C2 are in an engaged state, and the drive shaft S1 transmits power to the output shaft S6 via the second forward path and the second output path;

a fifth forward gear: the clutch CF and the clutch C3 are in an engaged state, and the drive shaft S1 transmits power to the output shaft S6 via the first forward path and the third output path;

a sixth forward gear: the clutch CFH and the clutch C3 are in an engaged state, and the drive shaft S1 transmits power to the output shaft S6 via the second forward path and the third output path;

a seventh forward gear: the clutch CF and the clutch C4 are in an engaged state, and the drive shaft S1 transmits power to the output shaft S6 via the first forward path and the fourth output path;

an eighth forward gear: the clutch CFH and the clutch C4 are in an engaged state, and the drive shaft S1 transmits power to the output shaft S6 via the second forward path and the fourth output path;

a first backward gear: the clutch CR and the clutch C1 are in an engaged state, and the drive shaft S1 transmits power to the output shaft S6 via the backward path and the first output path;

a second backward gear: the clutch CR and the clutch C2 are in an engaged state, and the drive shaft S1 transmits power to the output shaft S6 via the backward path and the second output path;

a third backward gear: the clutch CR and the clutch C3 are in an engaged state, and the drive shaft S1 transmits power to the output shaft S6 via the backward path and the third output path; and a fourth backward gear: the clutch CR and the clutch C4 are in an engaged state, and the drive shaft S1 transmits power to the output shaft S6 via the backward path and the fourth output path, the modular design gearbox is used to implement a less-gear mode, the less-gear mode comprises a four-forward-gear/four-backward-gear mode;

in the four-forward-gear/four-backward-gear mode, the clutch CFH, the floating gear Z5 and the fixed gear Z2 do not participate in transmission, wherein:

a first forward gear: having a same transmission path as the first forward gear in the eight-forward-gear/four-backward-gear mode;

a second forward gear: having a same transmission path as the third forward gear in the eight-forward-gear/four-backward-gear mode;

a third forward gear: having a same transmission path as the fifth forward gear in the eight-forward-gear/four-backward-gear mode;

a fourth forward gear: having a same transmission path as the seventh forward gear in the eight-forward-gear/four-backward-gear mode;

a first backward gear: having a same transmission path as the first backward gear in the eight-forward-gear/four-backward-gear mode;

a second backward gear: having a same transmission path as the second backward gear in the eight-forward-gear/four-backward-gear mode;

a third backward gear: having a same transmission path as the third backward gear in the eight-forward-gear/four-backward-gear mode; and a fourth backward gear: having a same transmission path as the fourth backward gear in the eight-forward-gear/four-backward-gear mode.

2. The modular design gearbox according to claim 1, wherein, a connecting line of projections of a shaft axis of the drive shaft S1, a shaft axis of the intermediate shaft S2, and a shaft axis of the intermediate shaft S3 in a plane perpendicular to the shaft axis of the drive shaft S1 is triangular, and a connecting line of projections of the shaft axis of the intermediate shaft S3, a shaft axis of the intermediate shaft S4, a shaft axis of the intermediate shaft S5, and a shaft axis of the output shaft S6 in a plane perpendicular to the shaft axis of the intermediate shaft S3 is quadrilateral.

3. A modular design gearbox, comprising a body, wherein the modular design gearbox further comprises:

a drive shaft S1, provided thereon with a fixed gear Z2, a floating gear Z1 installed through a clutch CR, and a floating gear Z3 installed through a clutch CF;

an intermediate shaft S2, provided thereon with a fixed gear Z4, a fixed gear Z6, and a floating gear Z5 installed through a clutch CFH, the fixed gear Z6 being engaged with the floating gear Z3, and the floating gear Z5 being engaged with the fixed gear Z2;

an intermediate shaft S3, provided thereon with a fixed gear Z7 and a fixed gear Z8, the fixed gear Z7 being engaged with the floating gear Z1, and the fixed gear Z7 being engaged with the fixed gear Z4;

an intermediate shaft S4, provided thereon with a fixed gear Z11, a floating gear Z9 installed through a clutch C2, and a floating gear Z10 installed through a clutch C1, the floating gear Z9 being engaged with the fixed gear Z7, and the floating gear Z10 being engaged with the fixed gear Z8;

an intermediate shaft S5, provided thereon with a fixed gear Z14, a floating gear Z12 installed through a clutch C4, and a floating gear Z13 installed through a clutch C3, the floating gear Z12 being engaged with the fixed gear Z7, and the floating gear Z13 being engaged with the fixed gear Z8; and an output shaft S6, provided thereon with a fixed gear Z15 and a fixed gear Z16, the fixed gear Z15 being engaged with the fixed gear Z11, and the fixed gear Z16 being engaged with the fixed gear Z14, in a forward gear mode, rotation directions of the drive shaft S1, the intermediate shaft S3 and the output shaft S6 are the same, and are opposite to rotation directions of the intermediate shaft S2, the intermediate shaft S4 and the intermediate shaft S5, and in a backward gear mode, the rotation directions of the drive shaft S1, the intermediate shaft S4 and the intermediate shaft S5 are the same, and are opposite to rotation directions of the intermediate shaft S3 and the output shaft S6, and the intermediate shaft S2 does not participate in transmission, wherein the modular design gearbox is used to implement a multi-gear mode, the multi-gear mode comprises an eight-forward-gear/four-backward-gear mode;

when the clutch CF is in an engaged state, a first forward path is formed from the floating gear Z3 through the fixed gear Z6 and the fixed gear Z4 to the fixed gear Z7;

when the clutch CFH is in an engaged state, a second forward path is formed from the fixed gear Z2 through the floating gear Z5 and the fixed gear Z4 to the fixed gear Z7;

when the clutch C1 is in an engaged state, a first output path is formed from the fixed gear Z8 through the floating gear Z10 and the fixed gear Z11 to the fixed gear Z15;

when the clutch C2 is in an engaged state, a second output path is formed from the floating gear Z9 through the fixed gear Z11 to the fixed gear Z15;

when the clutch C3 is in an engaged state, a third output path is formed from the fixed gear Z8 through the floating gear Z13 and the fixed gear Z14 to the fixed gear Z16;

when the clutch C4 is in an engaged state, a fourth output path is formed from the floating gear Z12 through the fixed gear Z14 to the fixed gear Z16; and when the clutch CR is in an engaged state, a backward path is formed from the floating gear Z1 to the fixed gear Z7;

in the eight-forward-gear/four-backward-gear mode, a first forward gear: the clutch CF and the clutch C1 are in an engaged state, and the drive shaft S1 transmits power to the output shaft S6 via the first forward path and the first output path;

a second forward gear: the clutch CFH and the clutch C1 are in an engaged state, and the drive shaft S1 transmits power to the output shaft S6 via the second forward path and the first output path;

a third forward gear: the clutch CF and the clutch C2 are in an engaged state, and the drive shaft S1 transmits power to the output shaft S6 via the first forward path and the second output path;

a fourth forward gear: the clutch CFH and the clutch C2 are in an engaged state, and the drive shaft S1 transmits power to the output shaft S6 via the second forward path and the second output path;

a fifth forward gear: the clutch CF and the clutch C3 are in an engaged state, and the drive shaft S1 transmits power to the output shaft S6 via the first forward path and the third output path;

a sixth forward gear: the clutch CFH and the clutch C3 are in an engaged state, and the drive shaft S1 transmits power to the output shaft S6 via the second forward path and the third output path;

a seventh forward gear: the clutch CF and the clutch C4 are in an engaged state, and the drive shaft S1 transmits power to the output shaft S6 via the first forward path and the fourth output path;

an eighth forward gear: the clutch CFH and the clutch C4 are in an engaged state, and the drive shaft S1 transmits power to the output shaft S6 via the second forward path and the fourth output path;

a first backward gear: the clutch CR and the clutch C1 are in an engaged state, and the drive shaft S1 transmits power to the output shaft S6 via the backward path and the first output path;

a second backward gear: the clutch CR and the clutch C2 are in an engaged state, and the drive shaft S1 transmits power to the output shaft S6 via the backward path and the second output path;

a third backward gear: the clutch CR and the clutch C3 are in an engaged state, and the drive shaft S1 transmits power to the output shaft S6 via the backward path and the third output path; and a fourth backward gear: the clutch CR and the clutch C4 are in an engaged state, and the drive shaft S1 transmits power to the output shaft S6 via the backward path and the fourth output path, the modular design gearbox is used to implement a less-gear mode, the less-gear mode comprises a four-forward-gear/four-backward-gear mode;

in the four-forward-gear/four-backward-gear mode, the clutch CF, the floating gear Z3 and the fixed gear Z6 do not participate in transmission, wherein:

a first forward gear: having a same transmission path as the second forward gear in the eight-forward-gear/four-backward-gear mode;

a second forward gear: having a same transmission path as the fourth forward gear in the eight-forward-gear/four-backward-gear mode;

a third forward gear: having a same transmission path as the sixth forward gear in the eight-forward-gear/four-backward-gear mode;

a fourth forward gear: having a same transmission path as the eighth forward gear in the eight-forward-gear/four-backward-gear mode;

a first backward gear: having a same transmission path as the first backward gear in the eight-forward-gear/four-backward-gear mode;

a second backward gear: having a same transmission path as the second backward gear in the eight-forward-gear/four-backward-gear mode;

a third backward gear: having a same transmission path as the third backward gear in the eight-forward-gear/four-backward-gear mode; and a fourth backward gear: having a same transmission path as the fourth backward gear in the eight-forward-gear/four-backward-gear mode.

4. The modular design gearbox according to claim 3, wherein, a connecting line of projections of a shaft axis of the drive shaft S1, a shaft axis of the intermediate shaft S2, and a shaft axis of the intermediate shaft S3 in a plane perpendicular to the shaft axis of the drive shaft S1 is triangular, and a connecting line of projections of the shaft axis of the intermediate shaft S3, a shaft axis of the intermediate shaft S4, a shaft axis of the intermediate shaft S5, and a shaft axis of the output shaft S6 in a plane perpendicular to the shaft axis of the intermediate shaft S3 is quadrilateral.

* * * * *